United States Patent Office 3,235,866
Patented Feb. 15, 1966

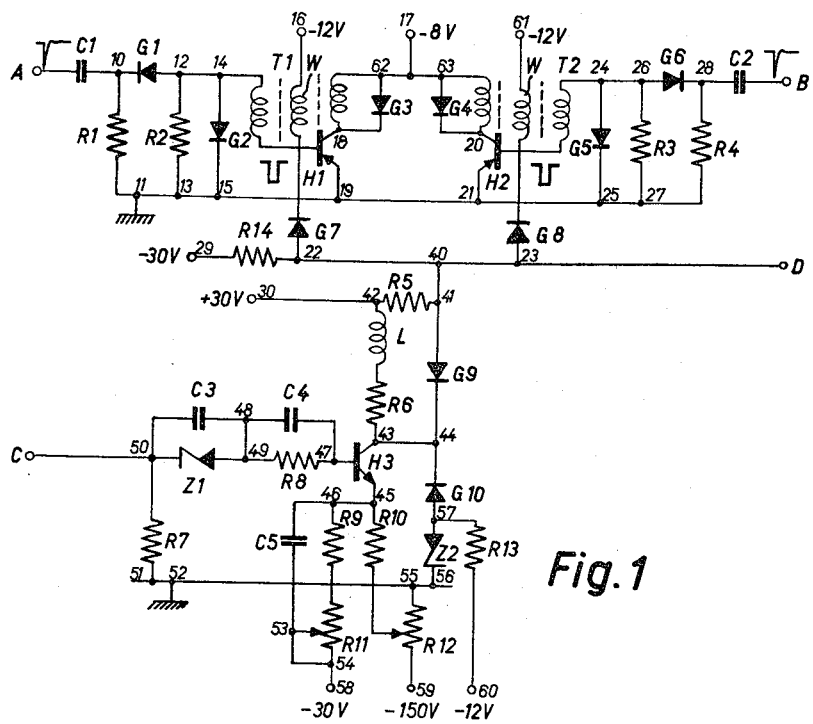
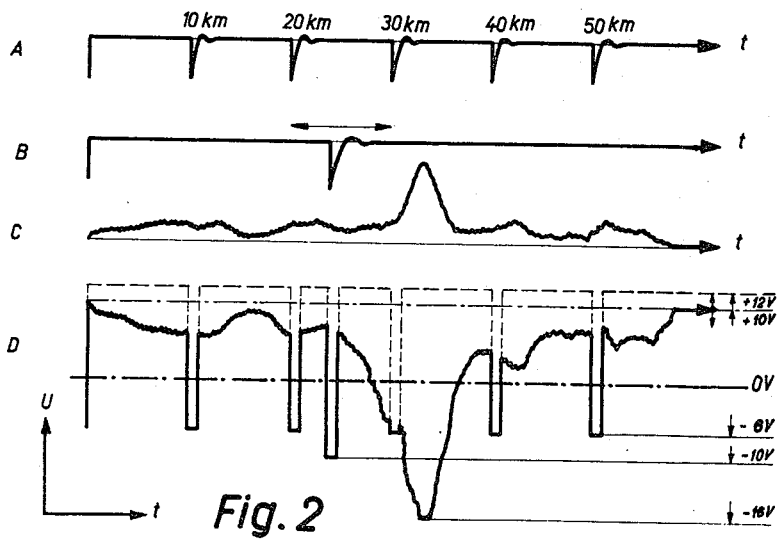

3,235,866
CONTROL CIRCUITRY FOR A RADAR INDICATOR
Fernand Ogay, Zurich, Switzerland, assignor to Albiswerk Zurich A.G., Zurich, Switzerland
Continuation of application Ser. No. 244,503, Dec. 13, 1962. This application Apr. 16, 1965, Ser. No. 453,535
Claims priority, application Switzerland, Dec. 22, 1961, 14,896/61
7 Claims. (Cl. 343—11)

This application is a continuation of my copending application Serial No. 244,503, filed December 13, 1962, now abandoned.

This invention pertains, in general, to control circuitry for radar indicators; and, in particular, to an improved circuit for enabling the display of both echo signal representations and range marker representations simultaneously on the image screen of an intensity-modulated cathode-ray tube radar indicator.

Among the presently used radar information displaying devices of the cathode-ray tube type is the plan position indicator; or, as it is commonly called, the PPI tube. The PPI tube furnishes both range and bearing, or azimuth, information about a target in the form of a polar coordinate map. Received (i.e., reflected) echos from a target are applied to the cathode-ray tube in such a manner as to produce an intensity modulation of the cathode-ray tube's beam. For example, a reflected (echo) signal from a target produces a bright spot on the image screen indicating the range and bearing of the reflecting target. If a brightened spot appears at the center of the image screen of the PPI tube, the target range is zero. On the other hand, if a brightened spot appears at the periphery of the screen, its range is at the maximum range for which a radar system is calibrated. Usually, a scanning antenna and the cathode-ray tube indicator are so arranged that the antenna position is oriented at the very center of the circular image screen. Consequently, a reflecting target directly to the east of the scanning antenna would appear as a bright spot of light on the right side of the image screen center and located from the center according to its range. A target directly to the west of the scanning antenna appears as a bright spot of light to the left side of the center of the screen. A bearing scale (azimuth scale) calibrated in degrees is ordinarily placed about the periphery of the image screen of the PPI tube so that range (i.e., distance and bearing (i.e., azimuth) from a true north, or magnetic north, direction is indicated in conformity with a polar coordinate mapping scheme wherein, as is well known, only range and azimuth from a predetermined reference point need be known.

Since the PPI tube presents a visible display of moving targets and fixed geographical bodies (i.e., land masses, etc.) it is highly useful for navigation, target location, fire control, etc.

In order to provide a visible display of targets and geographical bodies on the image screen of the PPI tube, the beam of the tube is swept radially from the center of image screen outwardly and, in addition, the radially swept beam is rotated around the image screen using the center of the screen as a pivot point; i.e., the beam is subjected to both a "radial sweep" and a "rotating sweep." The radial sweep of the tube's beam is a linear function; i.e., the radial distance swept being a function of time. The rotating sweep is also a linear function; i.e., the rotation, or angular distance, being a function of time. Operationally, a received echo signal, reflected from a target, intensity modulates the swept beam causing a so-called "bright scanning" of the beam. The intensity modulated beam causes a bright spot to appear on the image screen.

The range and azimuth of the bright spot (target) are controlled by the radial sweep and rotating sweep, respectively. Because the swept beam of the PPI tube is intensity modulated reflecting objects such as fixed land masses, buildings and moving targets appear as bright patches and bright spots against a relatively darker background.

In addition to displaying land masses of the explored (or, scanned) area and atargets therein, it is usual to provide two other informational displays on the image screen at the same time: fixed range signals; and, movable range marker signals. The fixed range marker signals intensity modulate the sweeping PPI tube beam to provide bright concentric rings on the tube screen. Each fixed range marker ring represents a fixed distance from the center of the screen; e.g., rings spaced at 10, 20 . . . 50 km. radii representations from the scanning antenna. Advantageously, a human operator can by virtue of the fixed range marker rings estimate the range of the target. For continuous and precise tracking of a moving target, a movable range marker signal also intensity modulates the sweeping PPI tube beam. The movable range marker signal is superimposed on the radial sweep and may be moved linearly along the radially sweeping beam to the position of the echo spot on the screen. The control means enabling the movement of the movable range marker is calibrated in units of radial distance, or range, so that the movable range marker signal intensity modulates the beam to provide a bright moving marker spot on the screen. When this marker spot and echo signal spot coincide, the range of the target can be precisely determined from the setting, or reading, on the control means thereby "tracking" the moving target and the control means transmits continuous range signals to servo-mechanism apparatus to continuously direct gunfire. Often, too, these signals are transmitted to a real time computer for providing surveillance information.

The fixed and movable range markers both appear as concentric circles on the tube's image screen due to the rotating sweep of the beam and due to the long persistence of the phosphors forming the display screen.

The control electrodes of the cathode-ray tube indicator are a cathode and a cylindrical modulator grid (called a Wehnelt cylinder in German radar terminology). The cathode is controlled with negative polarity pulses; the Wehnelt modulator grid with positive polarity pulses. Depending on the high-voltage power supply arrangement, the biasing potential of both electrodes is negative; or, one electrode may be at ground potential (e.g., the modulator grid being positive if the cathode is at ground or zero, potential).

In known control circuit arrangements echo signal pulses are applied to the cathode and range marker pulses are applied to the cylindrical modulator grid. This is disadvantageous because the modulator grid is capacitor coupled with the range marker pulse generating means and, as a consequence, integrates the marker pulses. Highly complex circuitry is, therefore, required to prevent this pulse integrating function. Although it is possible to directly couple these signal pulses to the modulator grid by resistance means, relatively high voltage levels of the signal pulses are required. While high voltage amplification of these signal pulses is obtainable with vacuum tubes, such amplification is difficult to achieve with transistor arrangements.

In known control circuit arrangements for coupling the outputs of many signal amplifier units by superimposition for modulating the beam of the cathode-ray tube, either through the cathode or through the Wehnelt modulator grid, capacitor or multi-grid tube arrangements have, heretofore, been used. But, with similar semiconductor element arrangements there would result undesired interactions between the various control signals. Of course, an arrangement of capacitors for coupling the various control signals would result in the undesired integration effects, hereinbefore mentioned.

One object of the present invention is to provide control circuitry, for cathode-ray tube radar indicators, which eliminates the undesirable integrating effects of the heretofore known radar indicator control circuits.

Another object of the present invention is to provide control circuitry for cathode-ray tube radar indicators; the control circuitry employing relatively low voltage semiconductor devices.

Another object of the present invention is to enable presentation of both echo signals and range marker signals on the image screen of a cathode-ray indicator.

Another object of the present invention is to provide control circuitry for a cathode-ray tube indicator wherein the dark level of the cathode-ray type indicator may be controlled in proportion to the echo signal amplitude.

According to one embodiment of the invention, fixed range marker signals, a movable range marker signal and echo signals are all coupled to the same control electrode, such as the cathode, of a cathode-ray indicator through and OR gate circuit; each of the aforesaid signals being coupled to the electrode through individual diodes. Amplifier means are provided for amplifying the received echo signals before they are translated through one of the diodes to the cathode, the amplification factor of the amplifier means and the dark level of the cathode-ray indicator are adjustable as a function of echo signal level input to said amplifier means. In addition, circuit means are provided for retaining the reference level of the range marker signals, independently of the echo signal level, on a more positive potential than the dark level of the indicator.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described a preferred embodiment of the invention.

In the drawings:

FIG. 1 is a schematic diagram of a control circuit according to the present invention;

FIG. 2A is a pulse vs. time graph showing the fixed range marker pulses as a function of time;

FIG. 2B is a pulse vs. time graph showing the movable range marker pulses as a function of time;

FIG. 2C is a pulse vs. time graph showing the echo signal pulses versus time; and FIG. 2D is a composite graph showing the fixed range marker pulses, the movable range marker pulses and the echo signal pulses of FIGS. 2A, 2B, and 2C, as a function of time.

Referring, first, to FIG. 1, there illustrated is the control circuitry according to the present invention.

As shown, there are provided the input terminals A, B, C, 16, 17, 61, 29, 30, 58, 59 and 60. As indicated, the terminals 16, 17, 61, 29, 30, 58, 59 and 60 have applied thereto (by sources not shown) the electric potentials +12 volts, +8 volts, +12 volts, −30 volts, +30 volts, −30 volts, −150 volts, and −12 volts, respectively. It is to be understood that the aforementioned electric potentials are, as to their quantitative values and polarities, to be considered as illustrative examples of the electric potentials which may be used. They are, of course, not to be considered as potentials which are unique to the control circuitry of the present invention. Other different electric potentials may be used.

Terminal D is the input terminal to the cathode-ray tube indicator's control electrode, such as its cathode.

As shown at FIG. 1, there is connected between terminal A and junction 10 a capacitor C1. Similarly, there is connected between the terminal B and the junction 28 the capacitor C2. Coupled between the junction 10 and t he junction 11 is the resistor R1; and, similarly, coupled between the junctions 27 and 28 is the resistor R4. As may be appreciated from the circuit diagram at FIG. 1, the conductor common to the junctions 11, 13, 15, 19, 21, 25 and 27 is grounded. Serially coupled between the points 10 and 12 and between the points 26 and 28 are the diodes G1 and G6, respectively. Coupled between the points 12 and 13 and between the points 26 and 27 are the resistors R2 and R3, respectively. Coupled in parallel with the resistors R2 and R3 are the diodes G2 and G5, respectively; the diode G2 being coupled in parallel with resistor R2 between points 14 and 15 while the diode G5 is coupled in parallel with resistor R3 between points 24 and 25.

Two transformers are provided: the transformers T1 and T2. Each of the transformers T1 and T2 has a central primary winding W which, as shown, is coupled with two secondary windings. One secondary winding of the transformer T1 is, as shown, connected between point 14 and the base of a transistor H1. Similarly, one secondary winding of the transformer T2 is connected between the point 24 and the base of the transistor H2. Another secondary winding of the transformer T1 is connected between point 62 and the collector electrode of the transistor H1. Similarly, another secondary winding of the transformer T2 is connected between the point 63 and the collector electrode of the transistor H2. In FIG. 1, the junction points of the aforesaid secondary windings with the collector electrodes of H1 and H2 are designated by the reference numerals 18 and 20. The emitter electrodes of the transistors H1 and H2 are connected to ground at points 19 and 21, respectively. Coupled in parallel across a secondary winding of each of the transformers T1 and T2 are the diodes G3 and G4, respectively; the diode G3 being connected between the terminals 62 and 18; and, the diode G4 being connected between terminals 63 and 20. As illustrated, the primary or central winding W of transformer T1 has applied thereto a positive potential of +12 volts at terminal 16. Similarly, terminal 61 of the central or primary winding of the transformer T2 has applied thereto a positive electric potential of +12 volts.

Diodes G7 and G8 are connected in series with the primary windings W of transformers T1 and T2, respectively. Diode G7 is connected to junction point 22 and diode G8 is connected to junction point 23, these junction points being in the line connecting terminals 29 and D. A resistor R14 is connected between junction point 22 and terminal 29, which latter has a potential of minus 30 volts applied thereto.

Intermediate the points 22 and 23, which are in connection with the diodes G7 and G8, respectively, there is the point 40. In common electrical connection with point 40 is the point 41. As shown, between the points 41 and 42, there is connected the resistor R5. Terminal 30, which is electrically the same as point 42, has applied thereto an electric potential of +30 volts. Between points 42 and 43 there are serially connected the inductor L and the resistor R6; and, between the points 41 and 44 there is connected the diode G9, the diode G9 being, as shown, in parallel connection with the series combination of resistor R5, inductor L and resistor R6.

The collector electrode of the transistor H3 is connected to points 43 and 44 as shown; the emitter electrode of the transistor H3 being directly connected to points 45 and 46.

The base electrode of the transistor H3 is connected to point 57. Between the points 47 and 48 there is connected a capacitor C4; and, between the points 47 and 49 there is connected the resistor R8, which forms a parallel circuit with the capacitor C4. The points 48 and 49 are commonly connected by the conductor means shown at FIG. 1. Between the points 49 and 50 there, is serially connected the Zener diode Z1, and between points 48 and 50 there is connected the capacitor C3; the capacitor C3 and the Zener diode Z1 being in parallel arrangement. As illustrated, the point 50 is directly connected with the input terminal C.

A resistor R7 is connected between junction point 50 and junction point 51, junction point 51 being in a conductor or line which is grounded at the junction point 52.

As shown, the resistor R10 is coupled between the emitter electrode of the transistor H3, at point 45, and a slideable contact of a potentiometer R12 which is connected between point 55 and terminal 59 as shown. Resistor R9 and potentiometer R11 are serially connected between point 46 and terminal 58. Connected in parallel across the serially connected resistor R9 and potentiometer R11 is the capacitor C5. One side of the capacitor C5 is connected at point 53, to the sliding contact, of the potentiometer R11, and the other side of the capacitor is connected to point 46. The terminals 53, 54 and 58 are electrically interconnected, and 58 has a potential of −30 volts impressed thereon.

Between points 51 and 44 there is connected the diode G9, and between points 44 and 57 there is connected another diode G10, the polarization of the diodes G9 and G10 being in opposition as shown. A Zener diode is connected between points 56 and 57. Between point 57 and terminal 60 there is connected the resistor R13.

Into the input terminal A of FIG. 1 there is fed a sequence of pulse signals representative of the fixed marker signal pulses. Into terminal B of the circuitry shown at FIG. 1 there is fed a signal representative of the adjustable marker signal pulse; the adjustable marker pulse being displaceable in time as indicated at FIG. 2B. The generation of these respectively fixed and displaceable, or adjustable, marker signal pulses may be accomplished in a manner well known in the art and with the circuits which are already known. (See for example MIT Radiation Laboratory Series, volume 5, entitled "Pulse Generators" authored by Glasoe and Lebasqz.)

As is well known, the input pulse signals at terminal A and at terminal B are, by virtue of the RC circuits (R1, C1 and R4, C2) differentiated; i.e., the voltage developed across resistor R1 is a differentiated signal of each pulse received at terminal A and the voltage developed across resistor R4 is a differentiated signal of the pulse received at terminal B. Since the pulse signals received at terminals A and B are of negative polarity, the diodes G1 and G6, respectively, being polarized as shown at FIG. 1, enable negative potentials to be impressed upon the base electrodes of the transistors H1 and H2, respectively. The transistors H1 and H2 together with the transformers T1 and T2 and the diodes G3 and G4, form blocking oscillators. These blocking oscillators function to convert the differentiated pulse signals across resistors R1 and R4, respectively, into negative pulses of definite pulse length duration. By means of the inductively coupled winding W of transformers T1 and T2 these negative signals of definite pulse duration are translated through diodes G7 and G8, respectively, to the cathode of the cathode-ray tube at terminal D. The diodes G2 and G5, being polarized and coupled to ground as shown at FIG. 1, prevent positive half wave signals from being reflected back to the input terminals A and B.

The input terminal C receives demodulated echo signal pulses from a signal amplifier (not shown). Echo signal pluses, of course, may also be fed to additional apparatus (not shown) such as, for example, a computer. The echo signals received are on the zero level. Output terminal D is coupled to the cathode of a cathode-ray tube indicator. The cathode of the cathode-ray tube requires for modulation purposes a signal which is between +12 volts and −16 volts. Therefore, the base bias of transistor H3, according to the aforementioned voltage values, is about −28 volts. The Zener diode Z1, having the capacitor C3 coupled in parallel therewith, provides the requisite voltage range (i.e. +12 to −16=28 volts). The capacitor C4, connected to the base of transistor H3, and the capacitor C5, connected to the emitter of transistor H3, provide an opposing polarity coupling relationship which provides a better differentiation between an echo signal pulse and noise. For example, a pulse having about 0.3 microsecond duration is amplified by about 20%.

Since the cathode-ray tube is essentially a capacitive load, the inductor L and resistor R6 provide a compensating reactive circuit to the capacitive impedance of the cathode-ray tube.

The Zener diode Z2, the diode G10 and the resistor R13 function to limit the amplitude of the echo signal pulse to about −18 volts so that the image screen of the cathode-ray tube indicator cannot be faced over. Below this limit (−18 volts) the diode G10 is blocked and thus cannot falsify the echo signal.

The degree of amplification of transistor H3 is set by adjusting the potentiometer R11 and the bright level for modulation of the image screen on the cathode-ray tube is set by adjusting potentiometer R12. Thus, the adjusted resistance values of R11 and R12, which are both in the emitter electrode circuit of the transistor H3, determine the operating current of the transistor H3. Both of the potentiometers R11 and R12 are to be adjusted that the diode G9 is just barely conductive for the smallest echo signal to be represented on the image screen of the cathode-ray radar tube.

The diodes G7, G8 and G9 function as an OR gate to couple the range marker signal pulses and the echo signal pulses to the cathode of the cathode-ray tube. A description of the function and operation of such an OR gate is believed not necessary here, since such a gate is described in full detail in "Proceedings of the IRE," June 1958, page 1250. The resistors R5 and R14 form a voltage divider between the terminals 29 and 30 (i.e., between the −30 volt potential on terminal 29 and the +30 volt potential on terminal 30). The voltage level at the output terminal D, which is the input to the cathode of the cathode-ray tube indicator, is at a level which is more positive than the dark level potential of the image screen. This positive potential on the output terminal D is adjustable (i.e., its amplitude is varied) for the smallest echo signal according to the impedance of diode G9 and the setting of the potentiometer R12.

At FIG. 2A there is graphically illustrated the input range marker pulses applied to terminal A. The time interval between pulses corresponds to distances of 10, 20, 30, 40 and 50 kilometers. FIG. 2B shows a movable range marker pulse applied to the terminal B. (This pulse is, as shown by the arrowheads in FIG. 2B, displaceable in time.) FIG. 2C shows a modulated echo signal pulse in the form in which it arrives at terminal C. In FIG. 2D there is represented the pulse of FIGS. 2A and 2B as coupled with the echo signal of FIG. 2C, after the range marker pulses are transformed by the blocking oscillators.

In FIG. 2D, the dark level of the cathode-ray tube is at +10 volts. The voltage divider comprising R5 and R14 furnishes a level of +12 volts. Assume that the amplitude of the fixed range marker signals is 18 volts and the amplitude of the movable range marker is 22 volts. The echo signal pulse is limited to +18 volts. For the smallest amplitude of the echo signal pulse there results at the cathode of the tube a potential of about 0.7 volt at a full modulation of 28 volts. Because the zero level for the range marker pulses is 2 volts lower than the dark level of the cathode-ray tube and this dark level is retained by virtue of the voltage divider R5–R14, fading of even very small echo signals is prevented.

While specific embodiments of the invention have been shown and described in detail to illustrate the application of the inventive principles, it will be understood that the

What is claimed is:

1. Control circuitry for providing, on the image screen of a cathode-ray radar indicator having a signal intensity modulated control electrode, simultaneous indications of the demodulated and amplified echo signal and of the fixed and variable range marker signals, said controlled circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; range marker signal input terminal means; and diode means connecting said range marker signal input terminal means to said output terminal, and conductive for the ranger marker signals.

2. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; and a pair of diode means each connecting a respective range marker signal input terminal to said output terminal, and conductive for the respective range marker signals.

3. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; a pair of diode means each connecting a respective range marker signal input terminal to said output terminal, and conductive for the respective range marker signals; and amplitude limiting means coupled between the terminal amplifier stage and said echo signal input terminal for limiting the amplification of the echo signals.

4. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; a pair of diode means each connecting a respective range marker signal input terminal to said output terminal, and conductive for the respective range marker signals; and compensation circuit means provided for neutralizing the capacitive load of the cathode-ray indicator's controlled electrode, said compensation circuit means being coupled in parallel with said second diode means.

5. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; and a pair of diode means each connecting a respective range marker signal input terminal to said output terminal, and conductive for the respective range marker signals; wherein each of said diodes is biased in its blocking direction.

6. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; and a pair of diode means each connecting a respective range marker signal input terminal to said output terminal, and conductive for the respective range marker signals; amplitude limiting means coupled between the terminal amplifier stage and said echo signal input terminal for limiting the amplication of the echo signals; said amplitude limiting means comprising an additional diode biased in its blocking direction and connected with the output of said terminal amplifier stage.

7. Control circuitry for providing, on the image screen of a cathode-ray radar indicator having a signal intensity modulated control electrode, simultaneous indications of the demodulated and amplified echo signals and of the fixed and variable range marker signals, said control circuitry comprising a terminal amplifier stage including a transistor; a first diode conductively connecting the collector of said transistor to an output terminal adapted for connection to said control electrode; an echo signal input terminal connected to the base of said transistor through a second diode; adjusting means in the emitter circuit of said transistor operable to adjust the emitter bias to correspondingly adjust the collector current and thus the bias of said control electrode, whereby the zero level of the echo signal can be adjusted with respect to the dark level of said indicator; a fixed range marker signal input terminal; a variable range marker signal input terminal; a pair of diode means each connecting a respective range marker signal input terminal to said output terminal, and conductive for the respective range marker signals; and voltage reference means for maintaining the reference level of the range marker signal independently of the level of the echo signal and on a more positive potential than that of the dark level of said indicator.

No references cited.

CHESTER L. JUSTUS, *Primary Examiner*.